United States Patent
Hsu et al.

(10) Patent No.: US 10,742,080 B2
(45) Date of Patent: Aug. 11, 2020

(54) ANNULAR MAGNETIC FLUX CHANNEL ROTOR MECHANISM

(71) Applicant: INDUSTRIAL TECHNOLOGY RESEARCH INSTITUTE, Hsinchu (TW)

(72) Inventors: Ming-Mao Hsu, Taichung (TW); Wen-Yang Peng, Hsinchu County (TW); Kuo-Lin Chiu, Taoyuan (TW); Chau-Shin Jang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 158 days.

(21) Appl. No.: 15/847,817

(22) Filed: Dec. 19, 2017

(65) Prior Publication Data
US 2018/0358850 A1   Dec. 13, 2018

Related U.S. Application Data

(60) Provisional application No. 62/517,075, filed on Jun. 8, 2017.

(30) Foreign Application Priority Data

Dec. 19, 2017   (TW) .............................. 106144507 A

(51) Int. Cl.
*H02K 3/12*   (2006.01)
*H02K 1/26*   (2006.01)
(Continued)

(52) U.S. Cl.
CPC ............... *H02K 1/26* (2013.01); *H02K 1/246* (2013.01); *H02K 3/12* (2013.01); *H02K 19/103* (2013.01); *H02K 17/16* (2013.01)

(58) Field of Classification Search
CPC ............ H02K 1/26; H02K 1/246; H02K 3/04; H02K 3/12; H02K 3/15; H02K 19/103;
(Continued)

(56) References Cited

U.S. PATENT DOCUMENTS 2,913,607 A   11/1959   Douglas et al.
3,721,844 A   3/1973   Fong
(Continued)

FOREIGN PATENT DOCUMENTS

CN   201438651 U   4/2010
CN   1726629 B   11/2010
(Continued)

OTHER PUBLICATIONS

EP Search Report in application No. 18158531.6 dated Aug. 22, 2018.
(Continued)

*Primary Examiner* — Maged M Almawri
(74) *Attorney, Agent, or Firm* — Maschoff Brennan

(57) ABSTRACT

A rotor mechanism includes a plurality of rotor bars and a rotor core. The rotor bars are disposed along the edge of the rotor core. The rotor core has a plurality of magnetic flux-barrier units and at least one flux channel. Each magnetic flux-barrier unit extends from one of the rotor bars to another rotor bar. The flux channel passes through the flux-barrier units and surrounds an axis of the rotor core, wherein each magnetic flux-barrier unit is a magnetic flux barrier, and the area between the adjacent magnetic flux-barrier units and the flux channel are pathways for magnetic flux.

9 Claims, 8 Drawing Sheets

(51) Int. Cl.
*H02K 19/10* (2006.01)
*H02K 1/24* (2006.01)
*H02K 17/16* (2006.01)

(58) Field of Classification Search
CPC ...... H02K 17/16; H02K 17/165; H02K 17/18; H02K 17/185; H02K 17/20; H02K 17/205; H02K 2213/03; H02K 1/27
USPC ....... 310/197, 156.01–156.84, 211–213, 125
See application file for complete search history.

(56) References Cited

U.S. PATENT DOCUMENTS

| | | | |
|---|---|---|---|
| 7,038,345 B2 * | 5/2006 | Fratta | H02K 1/246 310/156.53 |
| 9,490,673 B2 * | 11/2016 | Okubo | H02K 29/03 |
| 9,825,515 B2 * | 11/2017 | Ito | H02K 1/246 |
| 10,284,033 B2 * | 5/2019 | Janjic | H02K 1/246 |
| 10,396,608 B2 * | 8/2019 | Gontermann | H02K 19/02 |
| 2007/0152527 A1 * | 7/2007 | Yura | H02K 1/246 310/156.53 |
| 2008/0145252 A1 * | 6/2008 | Ku | F04C 18/3442 418/54 |
| 2009/0200876 A1 * | 8/2009 | Kusase | H02K 1/246 310/46 |
| 2010/0148613 A1 * | 6/2010 | Nam | H02K 19/14 310/156.83 |
| 2010/0247347 A1 | 9/2010 | Yoshino et al. | |
| 2013/0099607 A1 * | 4/2013 | Lendenmann | H02K 1/325 310/46 |
| 2014/0117791 A1 * | 5/2014 | Fiseni | H02K 29/03 310/48 |
| 2015/0372577 A1 * | 12/2015 | Haussmann | H02K 15/12 310/211 |
| 2016/0308408 A1 * | 10/2016 | Ronchetto | H02K 1/22 |
| 2017/0033624 A1 | 2/2017 | Kikuchi | |
| 2017/0110943 A1 * | 4/2017 | Tong | H02K 1/22 |
| 2017/0373573 A1 * | 12/2017 | Sidiropoulos | H02K 1/2766 |
| 2018/0301948 A1 * | 10/2018 | Hsu | H02K 15/02 |

FOREIGN PATENT DOCUMENTS

| | | |
|---|---|---|
| CN | 103208894 A | 7/2013 |
| CN | 105122613 A | 12/2015 |
| CN | 205544660 U | 8/2016 |
| GB | 940997 A | 11/1963 |
| GB | 1270807 A | 4/1972 |
| JP | 2015-126646 A | 7/2015 |
| TW | 200937806 A | 9/2009 |
| TW | M514695 U | 12/2015 |

OTHER PUBLICATIONS

Liu et al., "Bubbles and Blisters Impact on Die Casting Cage to the Designs and Operations of Line-Start Synchronous Reluctance Motors", IEEE Electromagnetic Field Computation, Nov. 13, 2016.
Damaki et al., "Design and Analysis of a Two-Speed Line Start Synchronous Motor: Scheme One" IEEE Transactions on Energy Conversion, vol. 31, No. 1, Mar. 2016.
Gamba et al., "Design of a Line-Start Synchronous Reluctance motor" IEEE Electric Machines & Drives Conferences, May 12, 2013.
Mingardi et al., "Optimal Choice of Stack Length and Conductors of Line Start Synchronous Motors", IEEE Power Electronics, Machines and Drives, Apr. 19, 2016.
Negandari et al., "Studying Crawling Effect in Line-Start Synchronous Reluctance Motors (LS-SynRM)", IEEE Industrial Electronics, Jun. 8, 2016.
Sato et al., "Topology optimization of Synchronous Reluctance Motor Using Normalized Gaussian Network", IEEE Transactions on Magnetics, vol. 51, Issue 3, Mar. 2015.
TW Office Action for application No. 106144507 dated Oct. 1, 2018.
CN Office Action in application No. 201711471786.5 dated May 20, 2019.

* cited by examiner

US 10,742,080 B2

ANNULAR MAGNETIC FLUX CHANNEL ROTOR MECHANISM

TECHNICAL FIELD

The disclosure relates to a rotor mechanism, more particularly to a rotor mechanism having annular magnetic flux channel.

BACKGROUND

Electric motors can convert electrical energy into mechanical energy through electromagnetic interactions. The electric motors are widely used in daily life and applied to many fields. For example, the electric motors can be applied to machine tools, water pumps, light machineries, wind power systems, hydroelectric power generation systems and the like. The electric motors are fundamental machines in industry and closely linked with economic development.

Regarding to energy saving issues, International Electrotechnical Commission (IEC) provides the energy efficiency standards for electric motors, for example, IE1 to IE4, even to IE5, from low to high. In order to achieve the high efficiency standards, induction electric motors mostly use high magnetically conductive materials or high level magnetically conductive steels, but the increase of efficiency has hit the bottleneck. As a result, some manufactures stop develop the induction electric motors, they start to put rare earth materials and actuator into an electric motor in order to achieve level IE5, but the overall cost is largely increased. In addition, the rare earth materials have potential problems of demagnetization, and such electric motors cannot be directly connected to electric supply. Thus, the developers are constantly trying to develop a high efficiency and cost effective electric motor.

SUMMARY OF THE INVENTION

The present disclosure provides a rotor mechanism having both advantages of synchronous and asynchronous electric motors and capable of providing high efficiency.

One embodiment of the disclosure provides a rotor mechanism including a plurality of rotor bars and a rotor core. The plurality of rotor bars are arranged along an edge of the rotor core, the rotor core has a plurality of flux barrier units and at least one annular magnetic flux channel. The plurality of flux barrier units respectively extend from one of the plurality of rotor bars to another one of the plurality of rotor bars, and the at least one annular magnetic flux channel penetrate through the plurality of flux barrier units and surround an axis of the rotor core. Each of the plurality of flux barrier units is a barrier for magnetic flux, and the at least one annular magnetic flux channel and a gap between the adjacent flux barrier units are channels for magnetic flux.

According to the rotor mechanism as discussed above, the arrangement of the flux barrier units and the annular magnetic flux channel is able to provide channels for magnetic flux when an electric motor having the rotor mechanism operates in asynchronous mode so as to increase torque, and is also able to control the magnetic flux in specific directions when the electric motor operates in synchronous mode, such that the rotor mechanism allows the electric motor to have both advantages of synchronous and asynchronous motors, thereby making the electric motor to provide ultra-premium efficiency.

The above description of the disclosure and the following description of embodiments of the disclosure are provided to exemplify and explain the spirit and principle of the disclosure and provide a further explanation of the scope of the disclosure.

DETAILED DESCRIPTION

Figure 1:
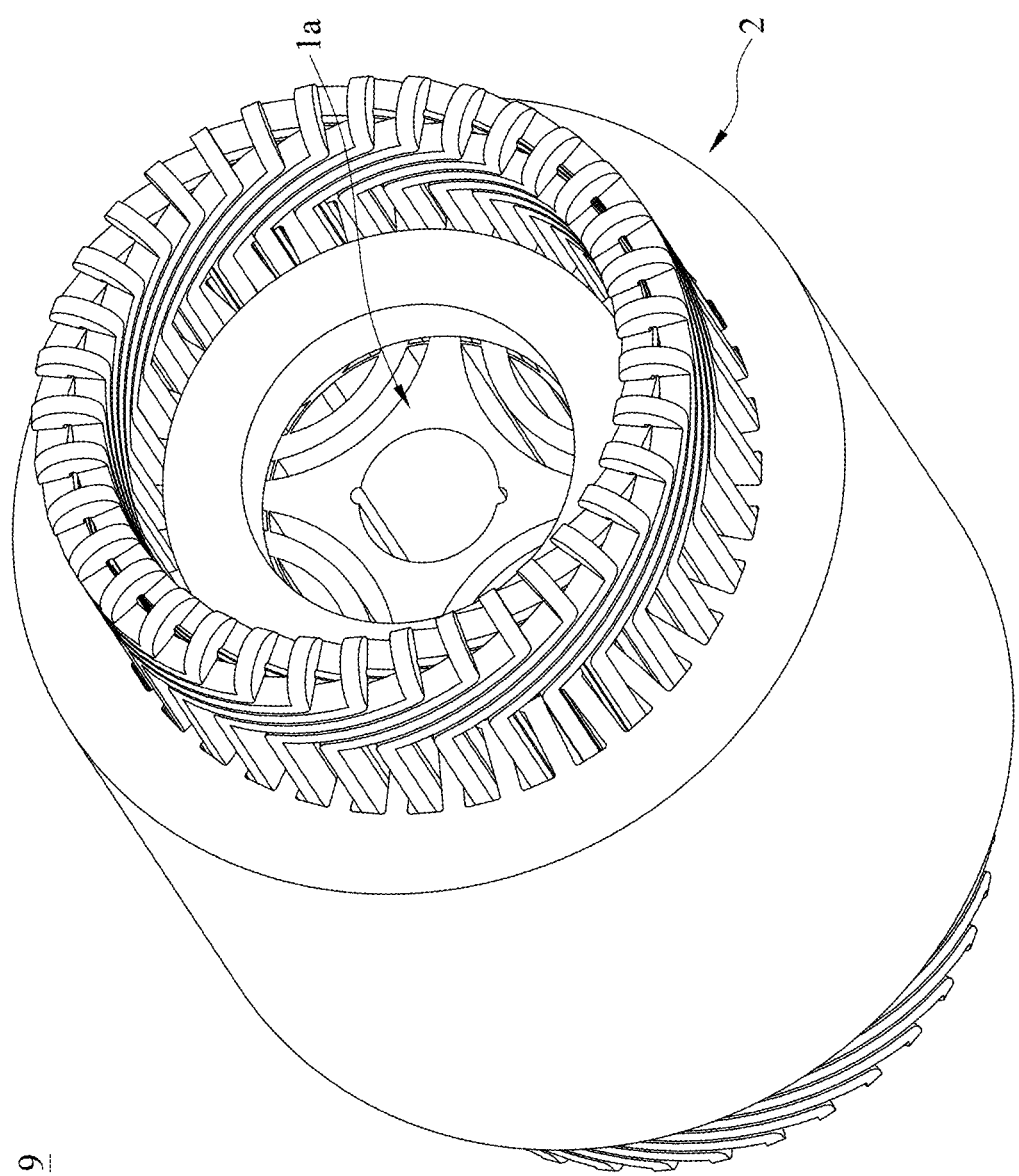
FIG. 1 is a perspective view of an electric motor according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, embodiments of the present disclosure will be disclosed below by way of illustration, and for the sake of clarity, many practical details will be described in the following description. However, it should be understood that these practical details are not intended to limit the present disclosure. In addition, to simplify the drawings, some conventional structures and components are schematically illustrated in the drawings, and some of the drawings omit structures (wires, cables, etc.) so as to keep the drawing clean and simple.

Furthermore, unless being specifically defined, all terms used herein, including technical and scientific terms, have their common meanings, as those whose meanings can be understood by those skilled in the art. Further, the definition of the above terms should be interpreted in the present specification as having the same meaning as the technical field related to the present disclosure. Unless specifically defined, these terms are not to be interpreted as being too idealistic or formal.

Figure 2:
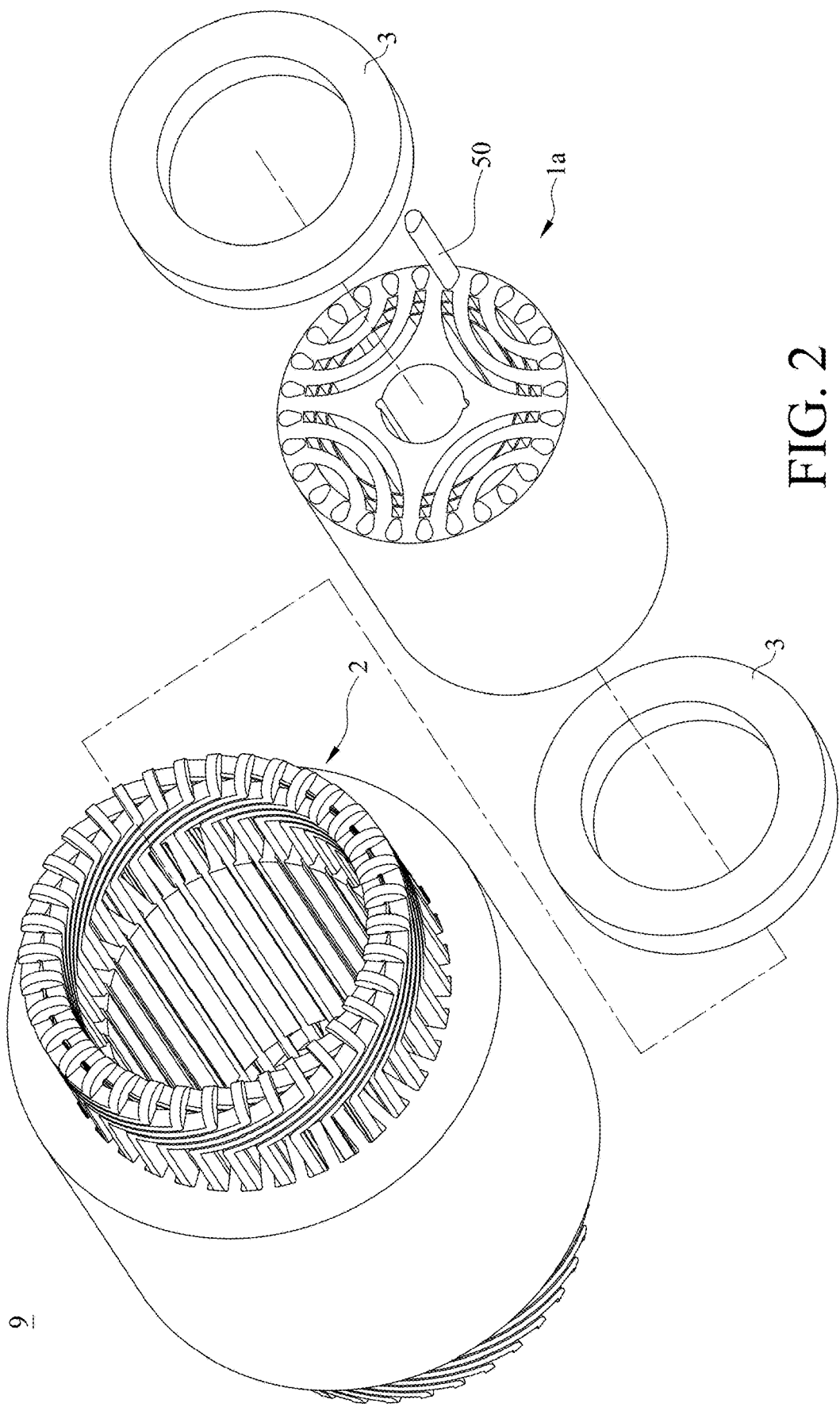
FIG. 2 is an exploded view of the electric motor in FIG. 1.

Please refer to FIGS. 1-2, FIG. 1 is a perspective view of an electric motor according to one embodiment of the disclosure, and FIG. 2 is an exploded view of the electric motor in FIG. 1.

This embodiment provides a rotor mechanism 1a which is adapted to an electric motor 9. The electric motor 9 includes a stator 2 and two end rings 3. The rotor mechanism 1a is rotatably located in the stator 2. The two end rings 3 are respectively disposed at two opposite end surfaces of the rotor mechanism 1a. However, the disclosure is not limited to the stator 2 and the end rings 3 and their configurations.

Figure 3:
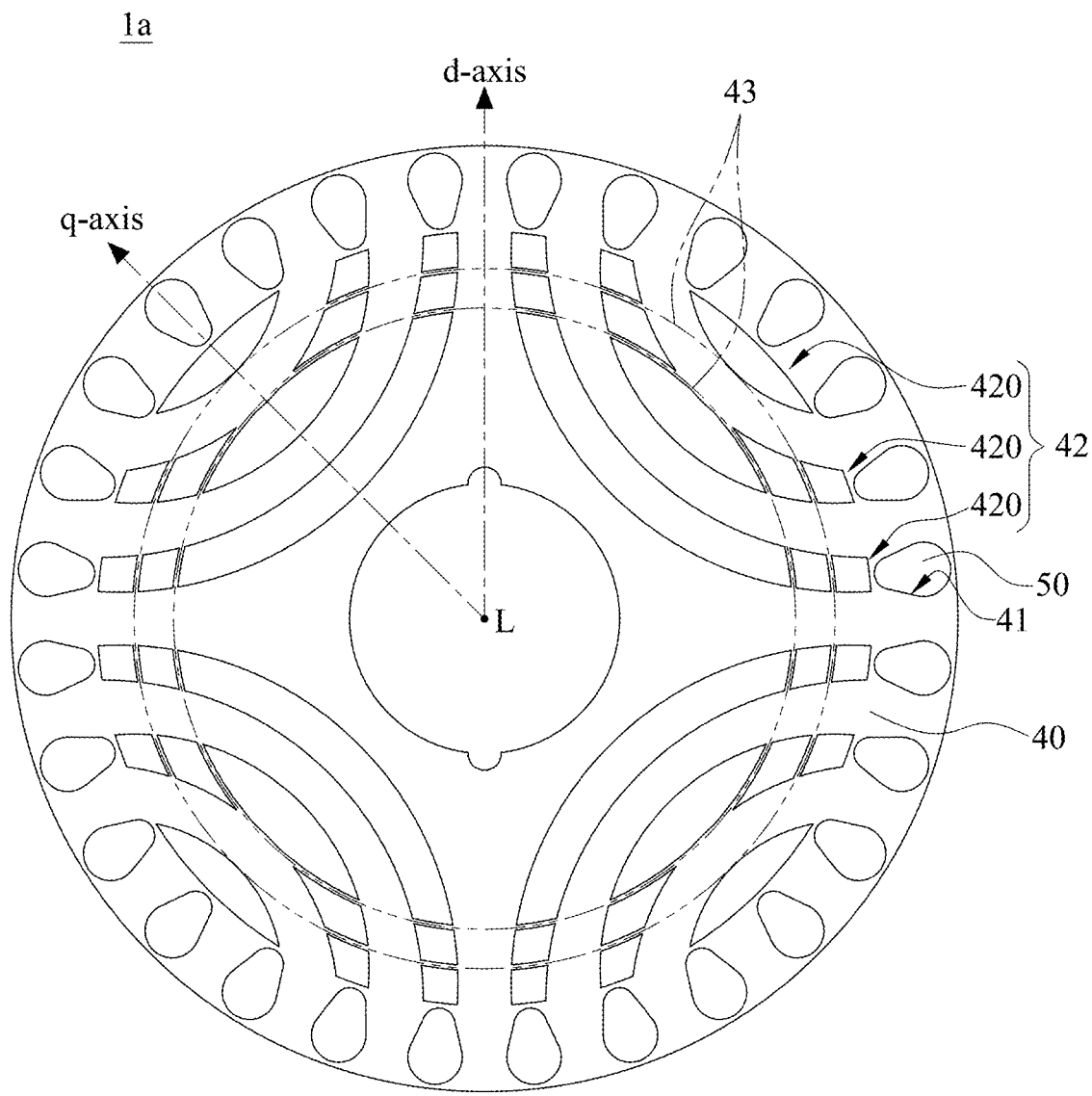
FIG. 3 is a front view of the electric motor in FIG. 1.

Then, the rotor mechanism 1a will be described in more detail in the following paragraphs. Please further refer to FIG. 3, FIG. 3 is a front view of the electric motor in FIG. 1. The rotor mechanism 1a includes a rotor core 40 and a plurality of rotor bars 50. The rotor core 40 has a plurality of rotor slots 41, a plurality of flux barrier groups 42 and a plurality of annular magnetic flux channels 43.

Figure 4:
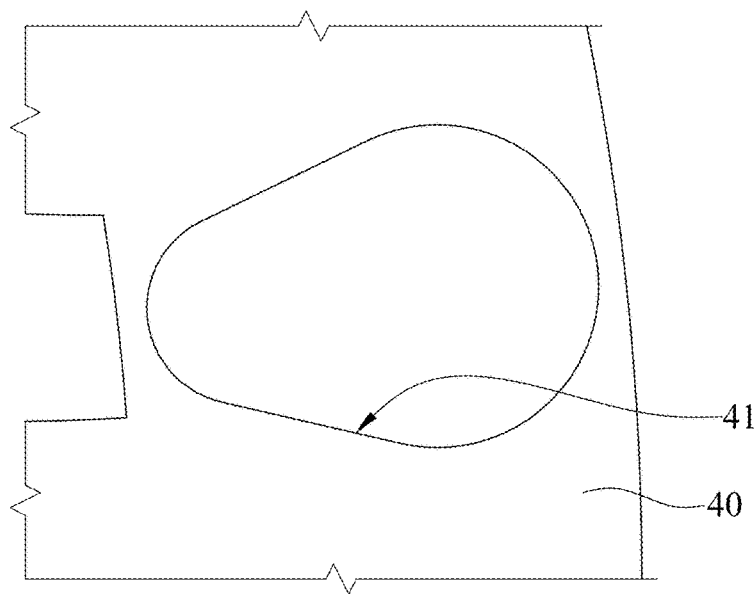
FIG. 4 is a partial enlarged view of a rotor core in FIG. 1.
Figure 5:
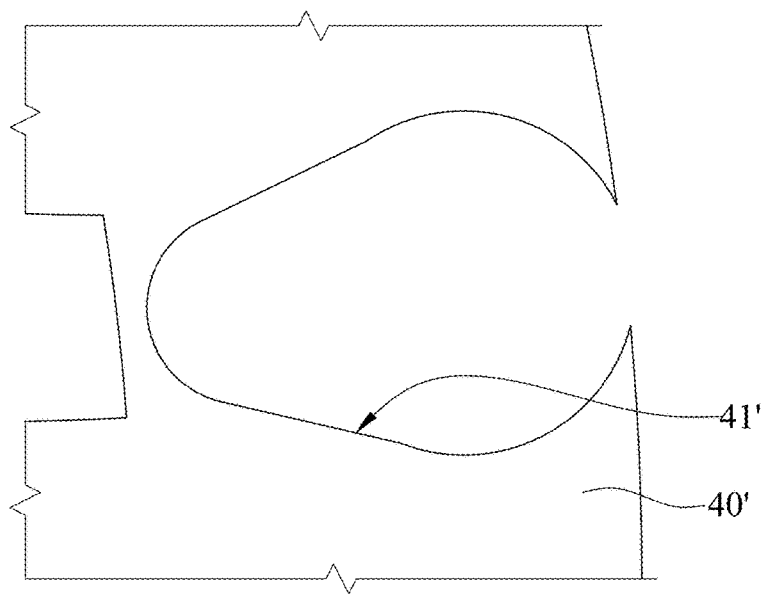
FIG. 5 is a partial enlarged view of a rotor core according to another embodiment of the disclosure.

The rotor slots 41 are arranged along an edge of the rotor core 40. In this embodiment, the rotor slots 41 are spaced apart from an annular outer wall (not numbered) of the rotor core 40. As shown in FIG. 4, it is a partial enlarged view of a rotor core in FIG. 1, but the present disclosure is not limited thereto. For example, as shown in FIG. 5, it is a partial enlarged view of a rotor core according to another embodiment of the disclosure, showing a rotor slot 41' connected to an annular outer wall of a rotor core 40'. In addition, in the embodiment of FIG. 1, the rotor slot 41 has a cross section in pear shape, but the present disclosure is not limited thereto. For example, in some other embodiments, the cross section of the rotor slot 41 may be in circle, oval or other geometry shapes.

Please refer back to FIG. 3, the rotor bars 50 are respectively inserted into the rotor slots 41.

The flux barrier groups 42 surround an axis L of the rotor core 40. In this embodiment, the quantity of the flux barrier groups 42 is the same as the quantity of the poles of the rotor core 40; in detail, in this embodiment, the rotor core 40 has four poles, and the quantity of the flux barrier groups 42 is four, and the four flux barrier groups 42 are respectively located in the four poles of the rotor core 40.

Each flux barrier group 42 includes a plurality of flux barrier units 420. The flux barrier unit 420 extends from one of the rotor slots 41 to another rotor slot 41; that is, the flux barrier unit 420 extends from one of the rotor bars 50 to another rotor bar 50. In addition, in this or some other embodiments, there is no magnetic in the flux barrier unit 420. Furthermore, in this embodiment, the flux barrier units 420 are spaced apart from the rotor slots 41; that is, the flux barrier units 420 are not directly connected to the rotor slots 41. Moreover, the quantity of the poles of the rotor core 40 (that is, the quantity of the flux barrier groups 42) and the quantity of the flux barrier units 420 in each flux barrier group 42 are not restricted, they all can be adjusted according to actual requirements.

In this embodiment, in each flux barrier group 42, the flux barrier units 420 are spaced apart at a fixed distance and arranged along a radial direction of the rotor core 40. Furthermore, in this embodiment, in each pole of the rotor core 40 (in each flux barrier group 42), there are three flux barrier units 420 arranged along the radial direction of the rotor core 40. However, the distance between the adjacent flux barrier units 420 is not restricted. For example, in some other embodiments, the flux barrier units in each flux barrier group are arranged along the flux radial direction but may be spaced apart at difference distance.

Figure 6:
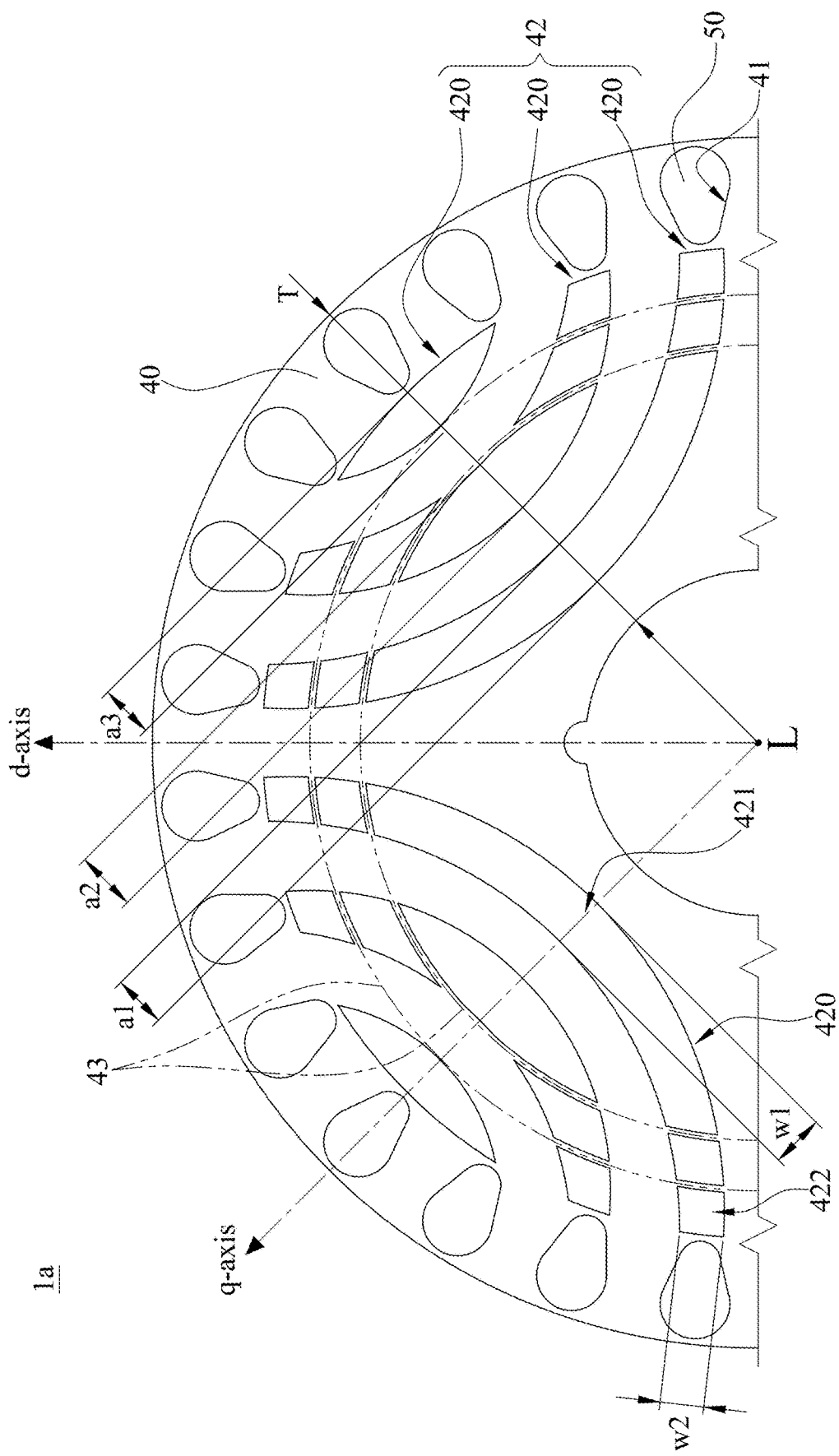
FIG. 6 is a partial enlarged view of the rotor core in FIG. 1.

Furthermore, please refer to FIG. 6, FIG. 6 is a partial enlarged view of the rotor core in FIG. 1. In each flux barrier group 42, the total length of the flux barrier units 420 in a symmetric line of the flux barrier group 42 (i.e. a line paralleling to the radial direction of the rotor core 40) equals to A (i.e. a1+a2+a3), and the thickness of the rotor core 40 in the said line, excluding the hollow portion at the axis L, equals to T.

The total length A and the thickness T are satisfied with the following condition:

$$1.4 \leq t/a \leq 2.5.$$

In addition, each flux barrier unit 420 has a central portion 421 having a width w1, and also has an end portion 422 having a width w2, and the following condition is satisfied:

$$0.3 \leq w1/w2.$$

It is noted that, in this embodiment, the annular magnetic flux channels 43 penetrate through the flux barrier units 420, so that some of the flux barrier units 420 are divided into a plurality of sub-units (not numbered). In detail, the annular magnetic flux channels 43 surround the axis L of the rotor core 40, and the annular magnetic flux channels 43 in this embodiment are concentric circles; that is, the annular magnetic flux channels 43 share the same center (i.e. the axis L) but every circle has different radius. However, the quantity of the annular magnetic flux channels 43 is not restricted, and it can be adjusted according to actual requirements. For example, in some other embodiments, the rotor core may only have one annular magnetic flux channel 43. In addition, the shape of the annular magnetic flux channel is not restricted to circle. For example, in some other embodiments, the shape of the annular magnetic flux channel may be oval or other geometric shapes. It is noted that, any annular magnetic flux channel, that penetrates the flux barrier units and surrounds the axis of the rotor core, falls within the scope of the present disclosure.

To the rotor core 40, each flux barrier unit 420 (including the sub-units) is a barrier for magnetic flux; that is, each sub-unit is a barrier for magnetic flux, but the annular magnetic flux channels 43 and the gap between the adjacent flux barrier units 420 (including the gap between the adjacent sub-units) all can serve as channel for magnetic flux. In operation, electricity is fed into the electric motor so as to generate excitation current in the rotor bars 50 that respond to the stator windings, such that the rotor core 40 is magnetized to form a closed-loop of magnetic flux line. At this moment, magnetic flux density (B) is the number of magnetic flux lines per unit cross sectional area of magnetic material. The arrangement of the annular magnetic flux channels 43 can serve as channels for magnetic flux when the electric motor is in asynchronous mode so as to increase torque, and also can control the magnetic flux in specific directions.

Figure 7A:
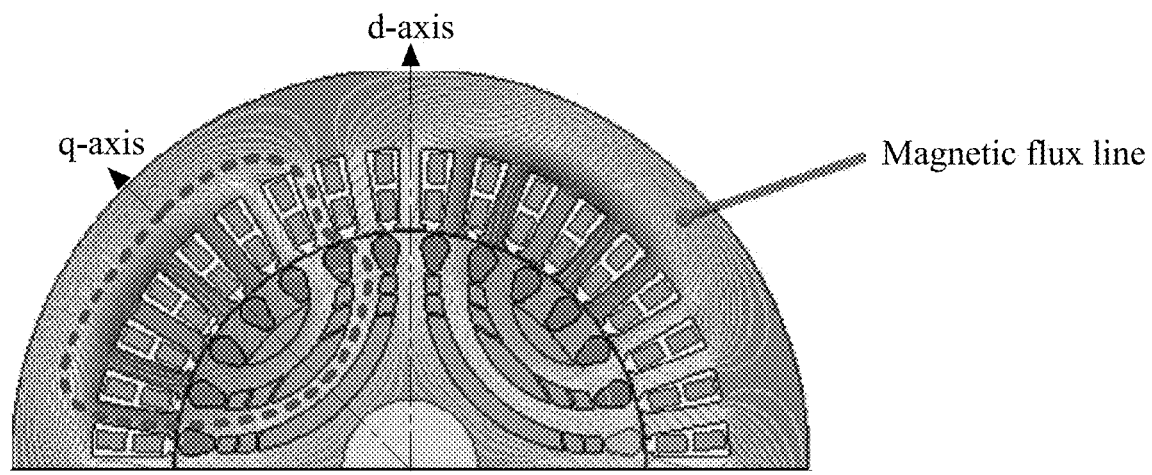
FIG. 7A shows magnetic flux line in the electric motor in FIG. 1 when it is in synchronous mode.
Figure 7B:
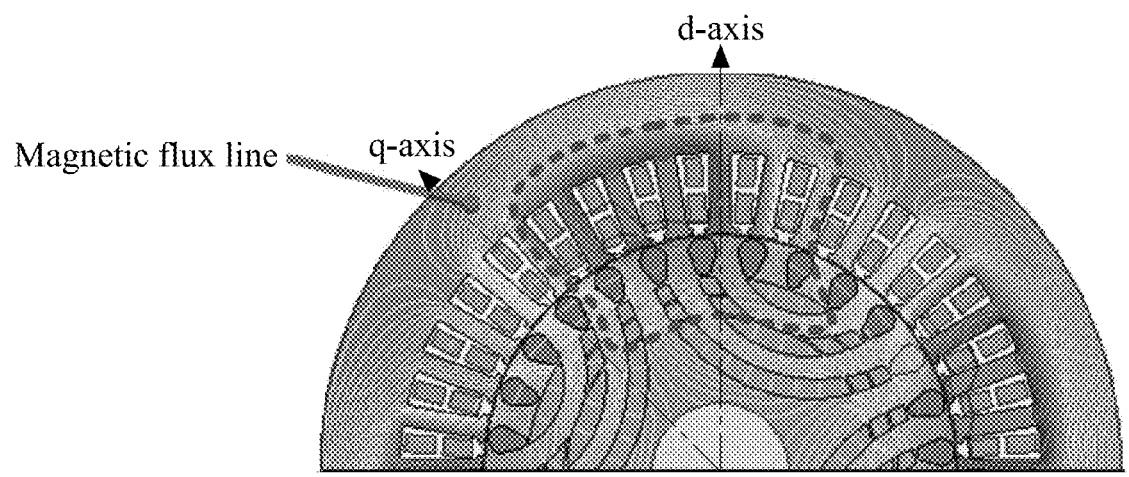
FIG. 7B shows magnetic flux line in the electric motor in FIG. 1 when it is in asynchronous mode.

For example, please refer to FIGS. 7A-7B, FIG. 7A shows magnetic flux line in the electric motor in FIG. 1 when it is in synchronous mode, and FIG. 7B shows magnetic flux line in the electric motor in FIG. 1 when it is in asynchronous mode.

FIG. 7A shows that the electric motor is in the synchronous mode, due to the arrangement of the flux barrier units 420 on the rotor core 40, magnetic flux is controlled in specific directions. At this moment, the magnetic flux is mostly limited to the gap between the adjacent flux barrier units 420. When it requires larger synchronous torque output, most of the magnetic flux goes along d-axis.

Then, FIG. 7B shows that the electric motor is in the asynchronous mode, when it requires larger asynchronous torque characteristics, due to the arrangement of the flux barrier units 420 on the rotor core 40, the magnetic flux is allowed to pass through the annular magnetic flux channels 43, and the magnetic flux is not limited to the area between the rotor bars 50 and the flux barrier units 420. Also, when the magnetic flux passes through the annular magnetic flux channels 43, the high magnetic material of the rotor core 40 can transport magnetic flux without oversaturation and has no hysteresis loss and eddy current loss, and the electric motor does not have a sharp increase in temperature, whereby increasing torque while operating in asynchronous mode.

In addition, according to a result of experiment, the arrangements of the annular magnetic flux channels 43 and the flux barrier units 420 help to gather the magnetic flux so as to adjust its density to an ideal value, for example, approximately 1.2 Tesla to 2.0 Tesla.

Figure 8:
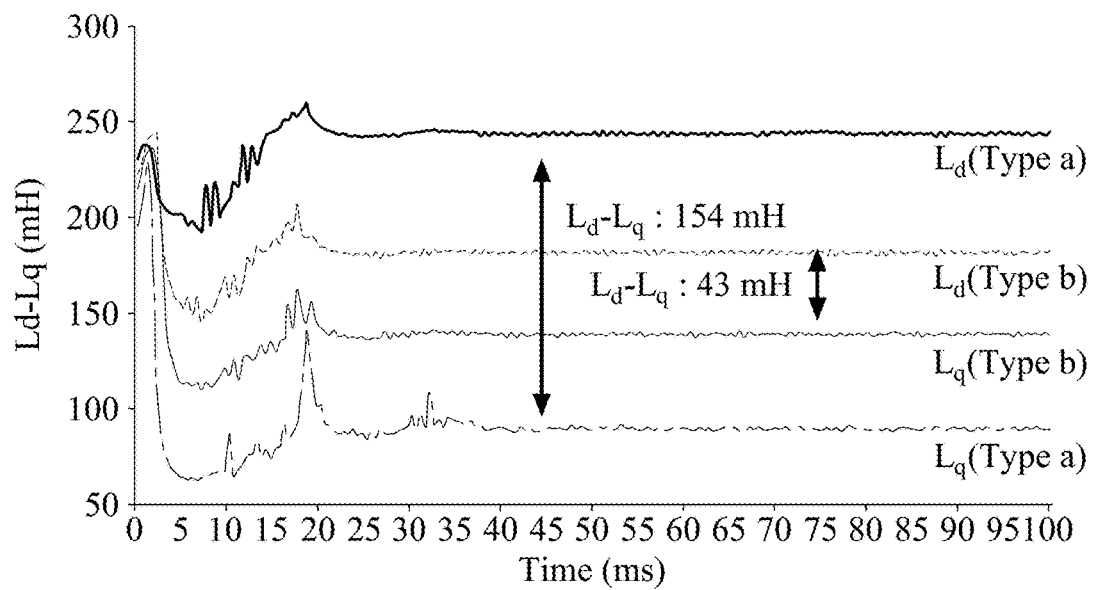
FIG. 8 shows inductance differences of the electric motor in FIG. 1 and another electric motor without annular magnetic flux channels.

The quantities of the flux barrier units 420 and the annular magnetic flux channels 43 are not restricted, in an exemplary embodiment of the disclosure, by adjusting the quantities of the flux barrier units 420 and the annular magnetic flux channels 43, an inductance of d-axis (Ld) is approximately 1 to 5 times an inductance of q-axis (Lq) so as to create an inductance difference (Ld–Lq). For example, FIG. 8 shows the inductance differences of two types of electric motors—type a and type b, wherein the type b is the electric motor in FIG. 1, and the type a is an electric motor without the annular magnetic flux channels. In detail, FIG. 8 shows the comparison of the inductance difference (Ld–Lq) between the electric motor with the annular magnetic flux channels 43 and another electric motor without the annular magnetic flux channels 43; it is noted that the only difference between these two electric motors is that one of them has the annular magnetic flux channels 43.

In more detail, in the aforementioned rotor mechanism 1a which has the annular magnetic flux channels 43, after it operates for a predetermined period of time, the inductance difference (Ld–Lq) between d-axis and q-axis is approximately 43 mH, and the Ld is approximately 1.4 times the Lq. In contrast, in the electric motor without the annular magnetic flux channels 43, the inductance difference (Ld–Lq) between the d-axis and q-axis is approximately 154 mH. The increase of the inductance difference (Ld–Lq) between the d-axis and q-axis will directly affect the amount of torque output and also will change the torque characteristics and efficiency of the electric motor.

Figure 9:
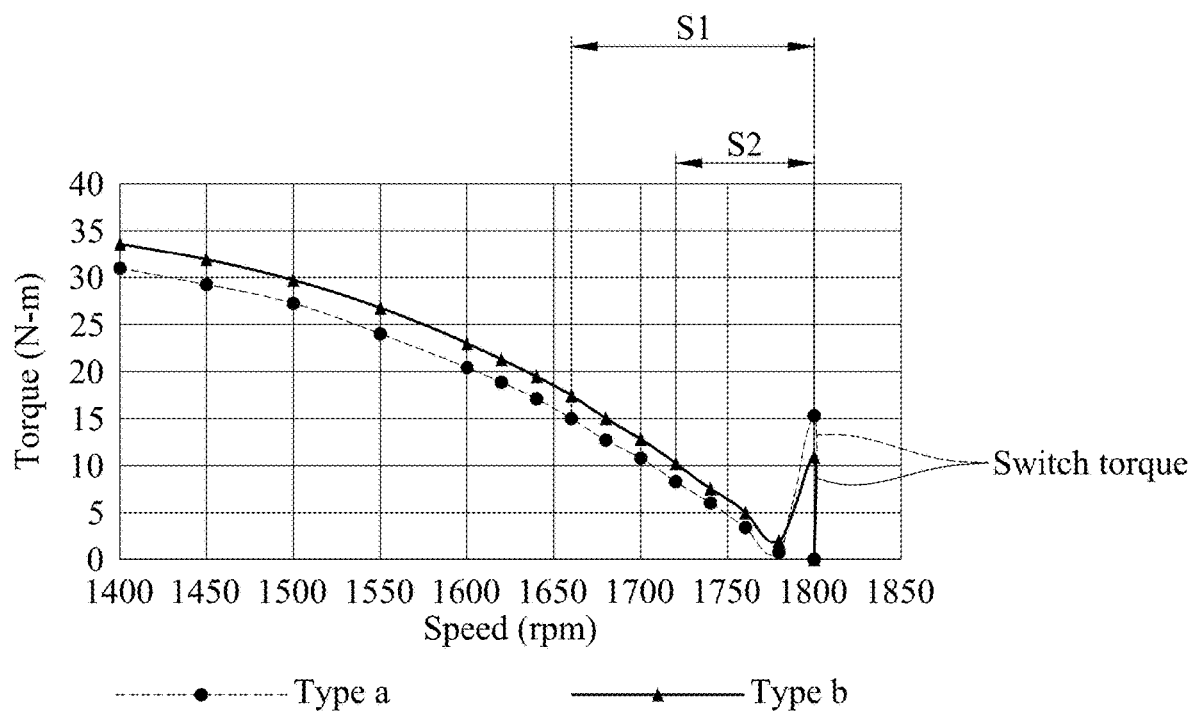
FIG. 9 shows comparison of switch torque of the electric motor in FIG. 1 and that of the electric motor without the annular magnetic flux channels.

Then, please refer to FIG. 9, which compares switch torque of the electric motor in FIG. 1 with that of an electric motor without the annular magnetic flux channel. It can be seen that, the more the amount of the sub-units of the flux barrier units 420 (that is, the rotor mechanism with the annular magnetic flux channels 43 penetrating through the flux barrier units 420), the great the torque in asynchronous operation and the less the torque in synchronous operation. In contrast, in the rotor mechanism without the annular magnetic flux channels 43, the torque in asynchronous operation is smaller, and the torque in synchronous operation is increased. FIG. 9 shows switching torque between the synchronous and asynchronous operations.

Also, the difference in structure causes the speed differences between the synchronous and asynchronous operations. It can be seen that the rotor mechanism with the annular magnetic flux channels 43 penetrating through the flux barrier units 420; that is, the great amount of the sub-units of the flux barrier units 420, the less a speed difference S2. In contrast, in the rotor mechanism without the annular magnetic flux channels 43, it has a greater speed difference S1.

Figure 10:
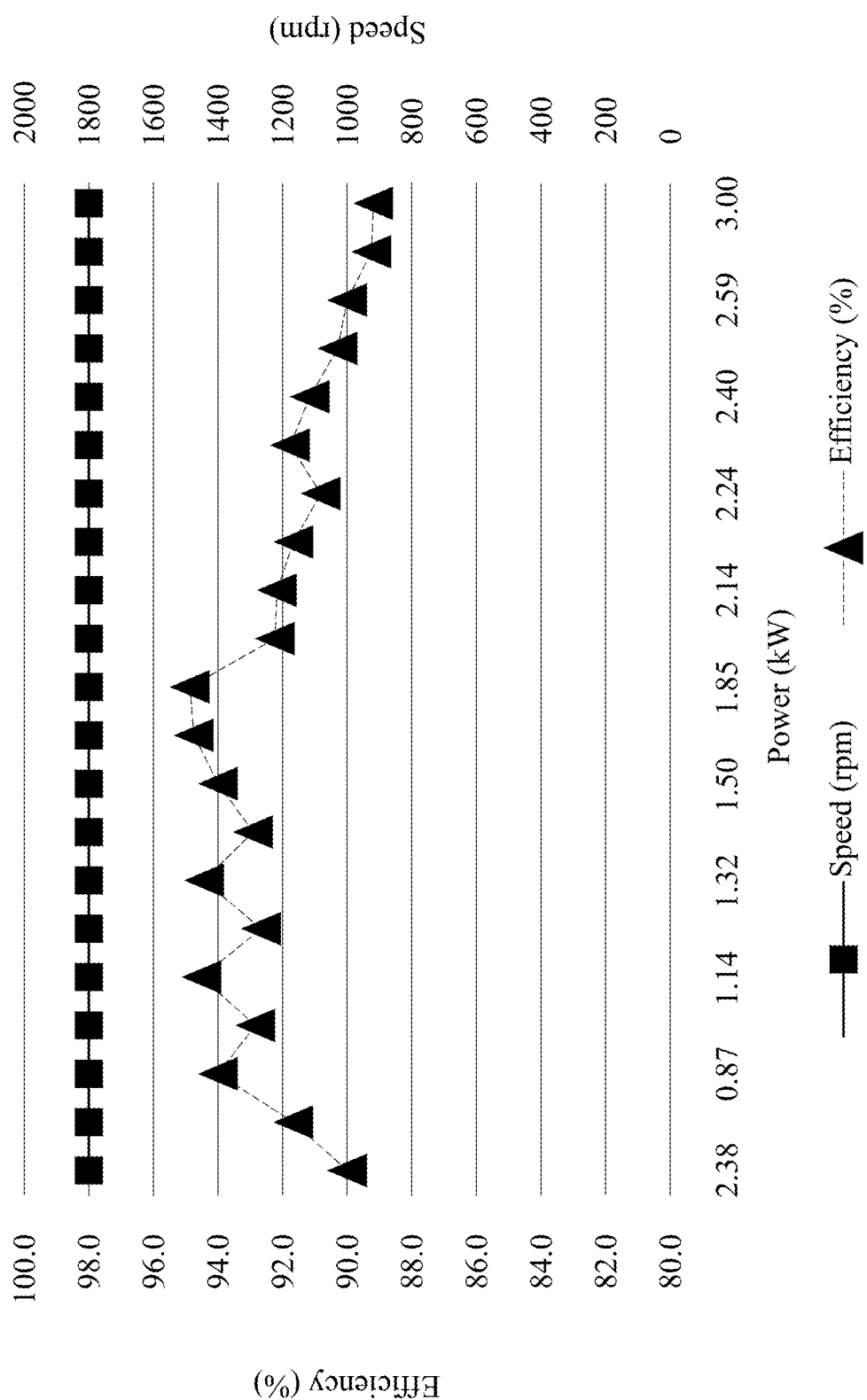
FIG. 10 is a graph showing efficiency of the electric motor in FIG. 1.

Then, please refer to FIG. 10, is a graph showing efficiency of the electric motor in FIG. 1. As shown in FIG. 10, among a wide range of power, the electric motor can provide an ultra-premium efficiency and synchronous operation characteristic.

Finally, the following is a temperature comparison table of the electric motor of the disclosure and a conventional electric motor. The table shows that both the electric motor operates in a condition of 1.5 kW/60 Hz/220V, and it can be seen that the increase of temperature of the electric motor of the disclosure is relatively lower than that of the conventional electric motor.

|  | electric motor | |
| --- | --- | --- |
|  | Electric motor of the disclosure | Conventional electric motor |
| environment temperature | 20.1° C. | 22.6° C. |
| Windings temperature | 41.5° C. | 78.8° C. |
| the increase of temperature | ΔT: 21.4° C. | ΔT: 56.2° C. |

As discussed in above, the arrangements of the flux barrier units 420 and the annular magnetic flux channels 43 at least can provide the following advantages:

(a) making the electric motor having the electric mechanism of the disclosure become a duo-mode electric motor capable of operating in synchronous mode and asynchronous mode;

(b) allowing the electric motor to provide ultra-premium efficiency when in synchronous mode;

(c) obtaining higher switch torque;

(d) making the switch torque 1 to 5 times than the torque output required by the rated power;

(e) obtaining higher energy conversion efficiency, for example, the electric motor in FIG. 1 is evaluated having an efficiency of 94% and at level IE5 by Taiwan Accreditation Foundation (TAF); and (f) dividing the flux barrier units into the sub-units by the annular magnetic flux channels, which helps to reduce the variation from switch torque to the torque in asynchronous mode.

It is understood that the rotor mechanism of the present disclosure is able to provide an ultra-premium efficiency in energy conversion, a self-start characteristic, an ability to operate in synchronous mode, an ability to operate in a wide range of power, an adjustment of torque, and an effect of moderately switching asynchronous and synchronous modes.

Although the present disclosure is disclosed by the foregoing embodiments, it is not intended to limit the scope of the present disclosure. Changes and modifications without departing from the spirit and scope of the present disclosure all fall within the protection scope of the present disclosure. For the protection scope defined by the present disclosure, please refer to the appended patent claims.

SYMBOL 1a rotor mechanism
9 electric motor
2 stator
3 end ring
40 rotor core
41 rotor slot
42 flux barrier group
43 annular magnetic flux channel
50 rotor bar 420 flux barrier unit
421 central portion
422 end portion
a、a1~a3 length of the flux barrier unit in radial direction of the rotor core
L axis
w1 width of central portion of flux barrier unit
w2 width of end portion of flux barrier unit

What is claimed is:

1. A rotor mechanism, comprising: a plurality of rotor bars; and a rotor core, the plurality of rotor bars being arranged along an edge of the rotor core, the rotor core having a plurality of flux barrier units and a plurality of annular magnetic flux channels, the plurality of flux barrier units respectively extending from one of the plurality of rotor bars to another one of the plurality of rotor bars, and at least one of the annular magnetic flux channels penetrating through the plurality of flux barrier units and surrounding an axis of the rotor core, wherein, each of the plurality of flux barrier units is a barrier for magnetic flux, and the at least one annular magnetic flux channel and a gap between the adjacent flux barrier units are channels for magnetic flux; wherein there are at least two of the plurality of annular magnetic flux channels spaced apart from the plurality of rotor bars each by at least one of the plurality of flux barrier units, the annular magnetic flux channels are concentric circles.

2. The rotor mechanism according to claim 1, wherein each of the flux barrier units has a central portion having a width which is w1 and an end portion having a width which is w2, the following condition is satisfied:

$0.3 \leq w1/w2$.

3. The rotor mechanism according to claim 1, wherein the rotor core further has a plurality of rotor slots for the plurality of rotor bars.

4. The rotor mechanism according to claim 3, wherein each of the plurality of rotor slots is connected to an annular outer wall of the rotor core.

5. The rotor mechanism according to claim 3, wherein each of the plurality of rotor slots is spaced apart from an annular outer wall of the rotor core.

6. The rotor mechanism according to claim 1, wherein the plurality of flux barrier units form a plurality of flux barrier groups, the plurality of flux barrier groups surround the axis of the rotor core, and the flux barrier units in each of the plurality of flux barrier groups are arranged in a radial direction of the rotor core.

7. The rotor mechanism according to claim 6, wherein the flux barrier units in each of the plurality of flux barrier groups are spaced apart at a fixed distance in the radial direction of the rotor core.

8. The rotor mechanism according to claim 6, wherein the flux barrier units in each of the plurality of flux barrier groups are spaced apart at different distances in the radial direction of the rotor core.

9. The rotor mechanism according to claim 6, wherein a total length of the flux barrier units in each of the plurality of flux barrier groups in the radial direction of the rotor core is A, and a thickness of the rotor core in the radial direction is 1, the following condition is satisfied: $1.4 \leq T/A \leq 2.5$.

* * * * *